US009043006B2

(12) United States Patent
Akatsu

(10) Patent No.: US 9,043,006 B2
(45) Date of Patent: May 26, 2015

(54) ACOUSTIC CHARACTERISTICS SETTING SUPPORT SYSTEM AND ACOUSTIC CHARACTERISTICS SETTING APPARATUS

(71) Applicant: Alpine Electronics, Inc., Tokyo (JP)

(72) Inventor: Hiroyuki Akatsu, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 175 days.

(21) Appl. No.: 13/932,691

(22) Filed: Jul. 1, 2013

(65) Prior Publication Data

US 2014/0031962 A1 Jan. 30, 2014

(30) Foreign Application Priority Data

Jul. 27, 2012 (JP) ................................. 2012-166894

(51) Int. Cl.

*G06F 17/00* (2006.01)
*H04R 29/00* (2006.01)
*H04B 1/00* (2006.01)
*H04R 5/02* (2006.01)
*H04R 3/00* (2006.01)
*H04R 3/04* (2006.01)
*H04M 1/60* (2006.01)
*H04M 1/725* (2006.01)
*H04S 7/00* (2006.01)

(52) U.S. Cl.

CPC ............... *H04R 3/00* (2013.01); *H04M 1/6091* (2013.01); *H04M 1/72525* (2013.01); *H04M 1/7253* (2013.01); *H04M 1/72558* (2013.01); *H04R 3/04* (2013.01); *H04R 29/001* (2013.01); *H04S 7/302* (2013.01); *H04R 2420/07* (2013.01); *H04R 2499/13* (2013.01)

(58) Field of Classification Search

CPC ..... H04L 65/605; H04L 65/604; H04L 67/30; H04L 67/303; H04L 67/306; H04R 29/001; H04R 29/007; H04R 3/00; H04R 3/12; H04R 1/227; H04R 1/26; H04R 2225/021; H04S 1/00; H04S 3/00
USPC ........... 700/94; 381/302, 86, 58, 99, 101, 103
See application file for complete search history.

(56) References Cited

U.S. PATENT DOCUMENTS 4,903,307 A 2/1990 Ozawa et al.
5,617,480 A * 4/1997 Ballard et al. .................. 381/86
2008/0225884 A1* 9/2008 Crandall et al. .............. 370/464
2009/0147134 A1 6/2009 Iwamatsu
2009/0226002 A1 9/2009 Komori
2013/0305152 A1* 11/2013 Griffiths et al. ............... 715/716

FOREIGN PATENT DOCUMENTS

JP 2649948 5/1997
JP 2009-130643 6/2009
WO WO 2007/139293 A1 12/2007

OTHER PUBLICATIONS

European Search Report for copending European Application No. 13177617.1 dated Nov. 29, 2013.

* cited by examiner

*Primary Examiner* — Jesse Elbin
(74) *Attorney, Agent, or Firm* — Brinks Gilson & Lione

(57) ABSTRACT

An audio setting application of a smart phone acquires tuning data from a tuning data setting server, which meets a search condition specified by a user. The audio setting application performs filtering of tuning parameters included in the tuning data. The tuning parameters are parameters of a plurality of acoustic characteristic items of an audio apparatus, and such parameters are excluded if the parameter cannot be expected to achieve an appropriate effect when the parameter is applied to the audio apparatus.

13 Claims, 6 Drawing Sheets

| INCONSISTENCY | EQUALIZER PARAMETER | TCR PARAMETER | CROSSOVER PARAMETER | ---------- |
|---|---|---|---|---|
| VEHICLE TYPE | | EXCLUDE | | ---------- |
| SUBWOOFER SIZE | | | EXCLUDE | ---------- |
| NUMBER OF SPEAKERS | | EXCLUDE | EXCLUDE | ---------- |
| LISTENING POSITION | | EXCLUDE | | ---------- |
| ⋮ | ⋮ | ⋮ | ⋮ | ⋱ |

FIG. 2A

| | |
|---|---|
| VEHICLE TYPE | VEHICLE NAME MODEL |
| LISTENING POSITION | FRONT RIGHT |
| SPEAKER SYSTEM | 8 SPEAKERS SUBWOOFER (16 cm OR MORE) PRESENCE |
| ⋮ | ⋮ |

FIG. 2B

REGISTERED 10/25/2011

| | | |
|---|---|---|
| REGISTERED DATE AND TIME | 12/03/2011 | |
| BIBLIOGRAPHY | CREATOR | USER A |
| | TITLE | FOR ARTIST MJ |
| | GENRE | POP |
| | COMMENT | TUNING FOR MJ. VIVID TUNING WITH EFFECTIVE BASS SOUND. |
| TARGET ACOUSTIC ENVIRONMENT | VEHICLE TYPE | VEHICLE TYPE MODEL |
| | LISTENING POSITION | FRONT RIGHT |
| | SPEAKER SYSTEM | 8 SPEAKERS SUBWOOFER (16 cm OR MORE) PRESENCE |
| | ⋮ | ⋮ |
| TUNING PARAMETERS | EQUALIZER | EQUALIZER SETTING DATA |
| | TCR | TCR SETTING DATA |
| | CROSSOVER | CROSSOVER SETTING DATA |
| | ⋮ | ⋮ |
| EVALUATION | RATING | 8.5 |
| | NUMBER OF RATINGS | 34 |
| | NUMBER OF DOWNLOADS | 125 |

TUNING DATA DB

| | | |
|---|---|---|
| | REGISTER | |
| CREATOR | A | |
| TITLE | FOR ARTIST MJ | |
| GENRE | POP ▽ | ~301 |
| COMMENT | TUNING FOR MJ. VIVID TUNING WITH EFFECTIVE BASE SOUND. | |
| VEHICLE TYPE | | |
| VEHICLE NAME | ODYSSEA | |
| MODEL | B | ~302 |
| SPEAKER SYSTEM | | |
| NUMBER OF SPEAKERS | 8 ▽ | |
| SUBWOOFER | PRESENCE (16 cm OR MORE) ▽ | |
| LISTENING POSITION | NOT SPECIFIED ▽ | |
| | (QUIT) (REGISTER) | ~303 |

FIG. 6

| INCONSISTENCY | EQUALIZER PARAMETER | TCR PARAMETER | CROSSOVER PARAMETER | ---------- |
|---|---|---|---|---|
| VEHICLE TYPE | | EXCLUDE | | ---------- |
| SUBWOOFER SIZE | | | EXCLUDE | ---------- |
| NUMBER OF SPEAKERS | | EXCLUDE | EXCLUDE | ---------- |
| LISTENING POSITION | | EXCLUDE | | ---------- |
| ⋮ | ⋮ | ⋮ | ⋮ | ⋱ |

ACOUSTIC CHARACTERISTICS SETTING SUPPORT SYSTEM AND ACOUSTIC CHARACTERISTICS SETTING APPARATUS

PRIORITY CLAIM

This application claims the benefit of Japanese Patent Application No. 2012-166894 filed on Jul. 27, 2012, and which is incorporated by reference herein in its entirety.

BACKGROUND

1. Field of the Invention

The present invention relates to a technique for setting acoustic characteristics of an audio apparatus.

2. Description of the Related Art

As a technique for setting acoustic characteristic parameters for an audio apparatus, such as an equalizer parameter for setting the frequency characteristics of a gain of the audio apparatus, a time correction (TCR) parameter for setting the delay among sounds output to speakers, a crossover parameter for setting the frequency band of sound output to each of the speakers, and the like, and a technique for downloading acoustic characteristic parameters stored in a server and setting the downloaded acoustic characteristic parameters for the audio apparatus, has been known (for example, Japanese Unexamined Patent Application Publication No. 2009-130643).

With the above-mentioned techniques for downloading acoustic characteristic parameters from a server and setting the downloaded acoustic characteristic parameters for an audio apparatus, the server may release stored various acoustic characteristic parameters, and users of individual audio devices are able to download desired acoustic characteristic parameters from the server and set the downloaded acoustic characteristic parameters for the audio apparatuses.

However, acoustic characteristics suitable for an audio apparatus depend on the acoustic environment such as the speaker configuration of the audio apparatus and an acoustic space to which the audio apparatus is applied. For the above reason, individual acoustic characteristic parameters stored in a server are only applicable to audio apparatuses under specific acoustic environments. Thus, the availability of desirable acoustic characteristic parameters is low.

That is, if acoustic characteristic parameters created so as to be suitable for an acoustic environment that is different from the acoustic environment of the audio apparatus are directly applied to the audio apparatus, output sound from the audio apparatus does not necessarily have an excellent sound quality. On the contrary, the output sound may have a low quality.

Under such circumstances, only acoustic characteristic parameters created so as to be suitable for an acoustic environment that totally matches an audio apparatus need to be applied to the audio apparatus. However, in this case, even if various acoustic characteristic parameters are stored in a server, only limited acoustic characteristic parameters can be used for individual audio apparatuses.

SUMMARY

Accordingly, it is an object of certain embodiments the present invention to improve the availability of acoustic characteristic parameters in a system for downloading acoustic characteristic parameters stored in a server and setting the downloaded acoustic characteristic parameters for an audio apparatus.

In order to achieve the above-mentioned object, according to an aspect of the present invention, there is provided an acoustic characteristics setting support system for supporting setting of parameters defining acoustic characteristics of an audio apparatus, the system including a server in which a plurality of pieces of shared data are registered, each of the plurality of pieces of shared data including parameter data and acoustic environmental data, the parameter data being a set of parameters for a plurality of acoustic characteristic items, the acoustic environmental data representing an acoustic environment in a form of a set of values of a plurality of acoustic environmental items, availability of the set of parameters of the parameter data being checked for the acoustic environment, and an acoustic characteristics setting apparatus that is capable of accessing the server. The acoustic characteristics setting apparatus includes a shared data acquiring unit that acquires the shared data from the server, a parameter-to-be-applied selecting unit that selects, as a parameter to be applied, a parameter for an acoustic characteristic item defined on the basis of an acoustic environment consistency pattern, which is a pattern of consistency or inconsistency of each acoustic environmental item between a value represented by the acoustic environmental data included in the shared data acquired by the shared data acquiring unit and a value under an acoustic environment of the audio apparatus from among parameters included in the parameter data included in the acquired shared data, and a parameter setting unit that sets for the audio apparatus, as a parameter for an acoustic characteristic item corresponding to the parameter selected for the audio apparatus, the parameter selected by the parameter-to-be-applied selecting unit as a parameter to be applied.

In the acoustic characteristics setting support system, the parameter-to-be-applied selecting unit of the acoustic characteristics setting apparatus may be configured to acquire an acoustic characteristic item defined as an acoustic characteristic item to be applied on the basis of the acoustic environment consistency pattern in accordance with a specific correspondence between a pattern of consistency or inconsistency of a value of each acoustic environmental item and an acoustic characteristic item defined as an acoustic characteristic item to be applied, and select, as the parameter to be applied, a parameter for an acoustic characteristic item obtained as the acoustic characteristic item to be applied from among the parameters included in the parameter data included in the acquired shared data.

In the acoustic characteristics setting support system, the parameter-to-be-applied selecting unit of the acoustic characteristics setting apparatus may be configured to acquire an acoustic characteristic item defined as an acoustic characteristic item not to be applied on the basis of the acoustic environment consistency pattern in accordance with a specific correspondence between an acoustic environmental item having inconsistent values and an acoustic characteristic item defined as an acoustic characteristic item not to be applied, and select, as the parameter to be applied, a parameter for an acoustic characteristic item not obtained as the acoustic characteristic item not to be applied from among the parameters included in the parameter data included in the acquired shared data.

In the acoustic characteristics setting support system, preferably, the parameter selected by the parameter-to-be-applied selecting unit of the acoustic characteristics setting apparatus as the parameter to be applied is a parameter for an acoustic characteristic item that is estimated that an effect that is similar to an effect on a sound quality achieved under the acoustic environment represented by the acoustic environmental data included in the acquired shared data is achieved on a sound quality of the audio apparatus under the acoustic environment of the audio apparatus.

In the acoustic characteristics setting support system, it is preferable that the acoustic environmental items include an item representing a configuration of a speaker system of the audio apparatus. Furthermore, in the case where the audio apparatus is mounted in an automobile, it is preferable that the acoustic environmental items include an item representing a type of the automobile in which the audio apparatus is mounted and that the acoustic environmental items include an item representing a listening position in the automobile in which the audio apparatus is mounted.

In the acoustic characteristics setting support system, an item representing frequency characteristics of a gain of the audio apparatus, an item representing delay characteristics between sounds output to speakers of the audio apparatus, or an item representing a frequency band of sounds output to the speakers of the audio apparatus may be used as the acoustic characteristic items.

Furthermore, in the acoustic characteristics setting support system, the server may have a search function of searching for, in response to a search request specifying a search condition from the acoustic characteristics setting apparatus, shared data that matches the specified search condition and providing the found shared data to the acoustic characteristics setting apparatus, and the shared data acquiring unit of the acoustic characteristics setting apparatus may be configured to acquire the shared data from the server by issuing the search request specifying the search condition to the server.

The acoustic characteristics setting support system described above selects a parameter for a plurality of parameters represented by parameter data included in shared data in accordance with a pattern of consistency or inconsistency of each acoustic environmental item between a value represented by the acoustic environmental data included in the shared data and a value under the acoustic environment of the audio apparatus, and only the selected parameter is set for the audio apparatus. Here, an acoustic characteristic item that is effective for the case where a parameter of parameter data of shared data is used under the acoustic environment of the audio apparatus can be identified in accordance with the pattern of consistency or inconsistency of each acoustic environmental item between a value represented by the acoustic environmental data included in the shared data and a value under the acoustic environment of the audio apparatus. Thus, in the acoustic characteristics setting support system, only a parameter that is effective for the use under the acoustic environment of the audio apparatus can be selected from among a plurality of parameters represented by parameter data included in shared data stored in the server, and only the selected parameter can be set for the audio apparatus.

As described above, according to an aspect of the invention, even in the case of shared data including parameter data that is effective for an acoustic environment that does not totally match the acoustic environment of the audio apparatus, only some of the parameters included in the parameter data can be used for the improvement of the sound quality of the audio apparatus. Consequently, the availability of shared data registered in the server can be improved.

As described above, according to the present invention, in a system for downloading acoustic characteristic parameters stored in a server and setting the downloaded acoustic characteristic parameters to an audio apparatus, the availability of acoustic characteristic parameters can be improved.

BRIEF DESCRIPTION OF THE DRAWINGS

FIGS. 2A and 2B are diagrams illustrating own acoustic environmental data and a tuning data DB used in an embodiment of the present invention;

FIG. 6 is a diagram illustrating the details of filtering performed in an embodiment of the present invention.

DETAILED DESCRIPTION

Hereinafter, embodiments of the present invention will be explained.

Figure 1:
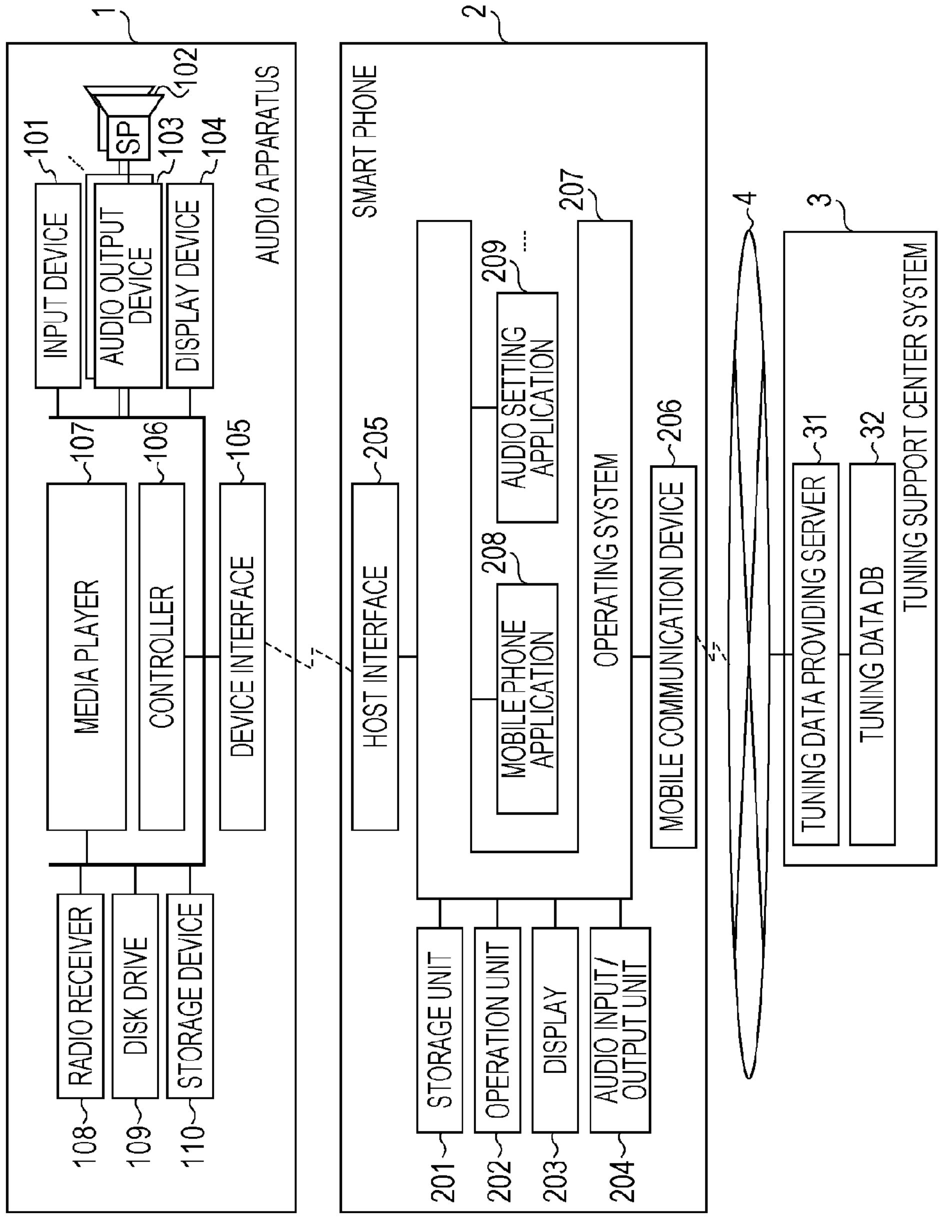
FIG. 1 is a block diagram illustrating an example of the configuration of an equalizer setting support system according to an embodiment of the present invention.

FIG. 1 illustrates an example of the configuration of an audio acoustic characteristics setting support system according to an embodiment of the present invention.

As illustrated in FIG. 1, an audio acoustic characteristics setting support system includes an audio apparatus 1 that is mounted in an automobile, a smart phone 2 that can be connected to the audio apparatus 1, and a tuning support center system 3 that can be accessed by the smart phone 2 via a wide area network (WAN) 4. The WAN 4 includes a network including a mobile communication network and the Internet connected to the mobile communication network.

The audio apparatus 1 is, for example, an apparatus mounted in an automobile and includes an input device 101, a plurality of speakers 102, audio output devices 103 provided for the corresponding speakers 102, a display device 104, a device interface 105, a controller 106, a media player 107, a radio receiver 108 that receives radio broadcasting, a disk drive 109 that plays a recording disk such as a compact disc (CD) or a digital versatile disk (DVD), and a storage device 110, as illustrated in FIG. 1.

The smart phone 2 is a mobile apparatus carried by a user and includes a storage unit 201, an operation unit 202, a display 203, an audio input/output unit 204 including a microphone and the speaker 102, a host interface 205, a mobile communication device 206 for accessing a mobile communication network, and an operating system 207, as illustrated in FIG. 1. Furthermore, the smart phone 2 includes, as applications managed by the operating system 207 and operating on the operating system 207, a plurality of applications including a mobile phone application 208 and an audio setting application 209.

The mobile phone application 208 is an application that provides a mobile phone function using the mobile communication device 206, the audio input/output unit 204, and the operation unit 202. With the audio setting application 209, for example, parameter setting processing for setting tuning parameters, which determine acoustic characteristics of the audio apparatus 1, is performed for the controller 106 of the audio apparatus 1.

Furthermore, the host interface 205 of the smart phone 2 and the device interface 105 of the vehicle-mounted apparatus communicate with each other through wireless connection using a wireless communication interface, such as Bluetooth (registered trademark), WIFI, or the like.

With the above-mentioned configuration, the media player 107 of the audio apparatus 1 outputs via the audio output devices 103 to the speakers 102 sound received by the radio receiver 108 through radio broadcasting. In addition, the media player 107 plays audio content recorded in a recording disk inserted in the disk drive 109 or in the storage device 110 and outputs the audio content to the speakers 102 via the audio output devices 103. Furthermore, the media player 107 includes an equalizer. The media player 107 changes the frequency characteristics of sounds of channels received through radio broadcasting or sounds of channels of audio content recorded in a storage disk or the storage device 110 on the basis of the frequency characteristics of the gain based on an equalizer parameter set by the controller 106, and outputs the sounds to the audio output devices 103 for the corresponding speakers 102 that are configured to output sounds of the corresponding channels.

The audio output devices 103 of the audio apparatus 1 perform processing for sound output from the media player 107. The processing includes delay processing for delaying the sound by a delay time corresponding to a TCR parameter set by the media player 107 and filtering processing for extracting a frequency band corresponding to a crossover parameter set by the controller 106. The audio output devices 103 also amplify sounds at amplification factors designated by the controller 106 and output the sounds to the corresponding speakers 102.

The controller 106 of the audio apparatus 1 causes the storage device 110 to store therein set acoustic characteristic parameters representing parameters of a plurality of acoustic characteristic items including the equalizer parameter, the TCR parameter, and the crossover parameter mentioned above. The controller 106 also performs processing for receiving via the input device 101 an operation by a user for editing set acoustic characteristic parameters and changing the parameters of acoustic characteristic items represented by the set acoustic characteristic parameters or processing for changing the parameters of acoustic characteristic items represented by set acoustic characteristic parameters in accordance with tuning parameters set by the smart phone 2. Changing of set acoustic characteristic parameters may be performed by receiving, with the audio setting application 209 of the smart phone 2, an operation by a user for editing acoustic characteristic parameters, notifying the controller 106 of the audio apparatus 1 of the edited acoustic characteristic parameters, and changing, with the controller 106 of the audio apparatus 1, the parameters of acoustic characteristic items (??? what are the items???) represented by the set acoustic characteristic parameters in accordance with the notified acoustic characteristic parameters.

Furthermore, every time a change occurs in a parameter for each acoustic characteristic item represented by the above-mentioned set acoustic characteristic parameter, the controller 106 of the audio apparatus 1 changes the acoustic characteristics of the audio apparatus 1 in accordance with the changed set acoustic characteristic parameter. That is, for example, when an equalizer parameter represented by a set acoustic characteristic parameter is changed, the changed equalizer parameter is set for the media player 107. When a TCR parameter or a crossover parameter represented by a set acoustic characteristic parameter is changed, the changed TCR parameter or crossover parameter is set for each of the audio output devices 103.

Own acoustic environmental data illustrated in FIG. 2A is registered in the storage unit 201 of the smart phone 2.

As illustrated in FIG. 2A, information on a plurality of acoustic environmental items, such as the type of vehicle representing the name and model of an automobile in which the audio apparatus 1 is mounted, the listening position representing user seating for optimizing the acoustic characteristics of the audio apparatus 1, a speaker system representing the number of speakers provided in the audio apparatus 1, presence or absence of a subwoofer, and the size of a subwoofer, and the like, is registered as information representing the acoustic environment of the audio apparatus 1 in the user's own acoustic environmental data.

Registration of information to the above-mentioned acoustic environmental data to be set is performed by the audio setting application 209. That is, the audio setting application 209 displays an appropriate own acoustic environmental data setting screen on the display 203, receives input of information on acoustic environmental items of acoustic environmental data to be set via the operation unit 202 by a user on the own acoustic environmental data setting screen, and registers the received contents to the acoustic environmental data to be set.

The tuning support center system 3 includes a tuning data providing server 31 connected to the WAN 4 and a tuning data DB 32, which is a database of tuning data.

As illustrated in FIG. 2B, a plurality of pieces of tuning data created by a user of the audio apparatus 1 and uploaded to the tuning support center system 3 are stored in the tuning data DB 32. The registered date and time, the bibliography, the target acoustic environment, tuning parameters, and evaluation are registered as the tuning data.

Parameters of acoustic characteristic items, such as an equalizer parameter, a TCR parameter, and a crossover parameter, that are set for the audio apparatus 1 by a user of the audio apparatus 1 and whose effect is checked on the basis of sound output from the audio apparatus 1 are registered as tuning parameters of the tuning data.

As the registered date and time, the date and time when tuning data was registered to the tuning data DB 32 is registered.

The bibliography includes a creator, a title, a genre, and a comment. As a creator, the name of a user of the audio apparatus 1 who created tuning parameters is registered. As a title, the title of the tuning data set by the creator is registered. Here, the creator uses a title that simply expresses the type of music for which the tuning parameters are suitable. As a genre, the type of music (rock music, pop music, etc.) set by the creator and for which the tuning parameters are suitable is registered. As a comment, the detailed explanation of the tuning parameters set by the creator is registered.

As the target acoustic environment, the acoustic environment of the audio apparatus 1 for which the tuning parameters are set by the creator and whose effect is checked on the basis of output sound is registered. As an acoustic environment, information on acoustic environmental items, such as the type of vehicle, the listening position, and the speaker system, is registered.

The evaluation includes rating, the number of ratings, and the number of downloads. As rating, the average of evaluation values of the tuning data is registered. As the number of ratings, the number of ratings representing the number of times the tuning data has been rated is registered. As the number of downloads, the number of times the tuning data has been downloaded is registered.

As described above, uploading of the above-mentioned tuning data to the tuning data DB 32 is performed by the user of the audio apparatus 1.

Hereinafter, an operation for uploading the tuning data will be explained.

In the case where the user of the audio apparatus 1 wants to share the current set acoustic characteristic parameters of the audio apparatus 1 with another user, the user instructs the audio setting application 209 of the smart phone 2 to start upload processing.

Figure 3:
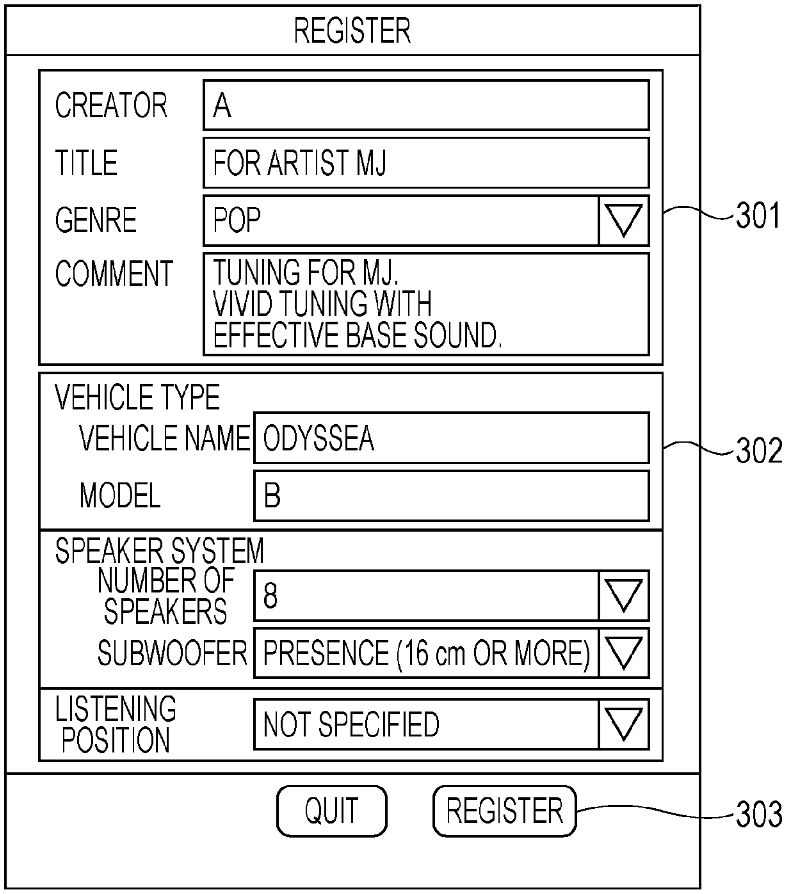
FIG. 3 is a diagram illustrating a registration screen used in an embodiment of the present invention.

The audio setting application 209 of the smart phone 2 receives the instruction to start upload processing, displays a registration screen illustrated in FIG. 3 on the display 203, and receives from the user input of information 301 on items of the bibliography including the creator, the title, the genre, and a comment and information 302 on acoustic environmental items representing the acoustic environment of the audio apparatus 1 of the user including the type of vehicle, the speaker system, and the listening position.

Regarding information on acoustic environmental items, information on corresponding acoustic environmental items registered in own acoustic environmental data stored in the storage unit 201 may be automatically input.

When a register button 303 provided on the registration screen is operated by the user, a registration request is issued to the tuning data providing server 31, along with registration data including received information and the current set acoustic characteristic parameters of the audio apparatus 1. The current set acoustic characteristic parameters of the audio apparatus 1 are acquired from the audio apparatus 1 via the controller 106. In the case where the current set acoustic characteristic parameters of the audio apparatus 1 are acoustic characteristic parameters edited using the audio setting application 209 as described above and set for the audio apparatus 1, the acoustic characteristic parameters may be used as the current set acoustic characteristic parameters of the audio apparatus 1.

Meanwhile, the tuning data providing server 31 receives the registration request, and creates new tuning data in which information of items of the bibliography of the registration data is set as information of items of the bibliography, information of acoustic environmental items of the registration data is set as information of acoustic environmental items of the target acoustic environment, and the set acoustic characteristic parameters are set as tuning parameters. Then, in the created tuning data, the current date and time is registered as the registered date and time, no rating is registered as rating, 0 is registered as the number ratings, and 0 is registered as the number of downloads. The tuning data newly created as described above is registered to the tuning data DB 32.

Next, a parameter setting process performed, using the audio setting application 209 of the smart phone 2, for setting tuning parameters for the controller 106 of the audio apparatus 1 will be explained.

Figure 4:
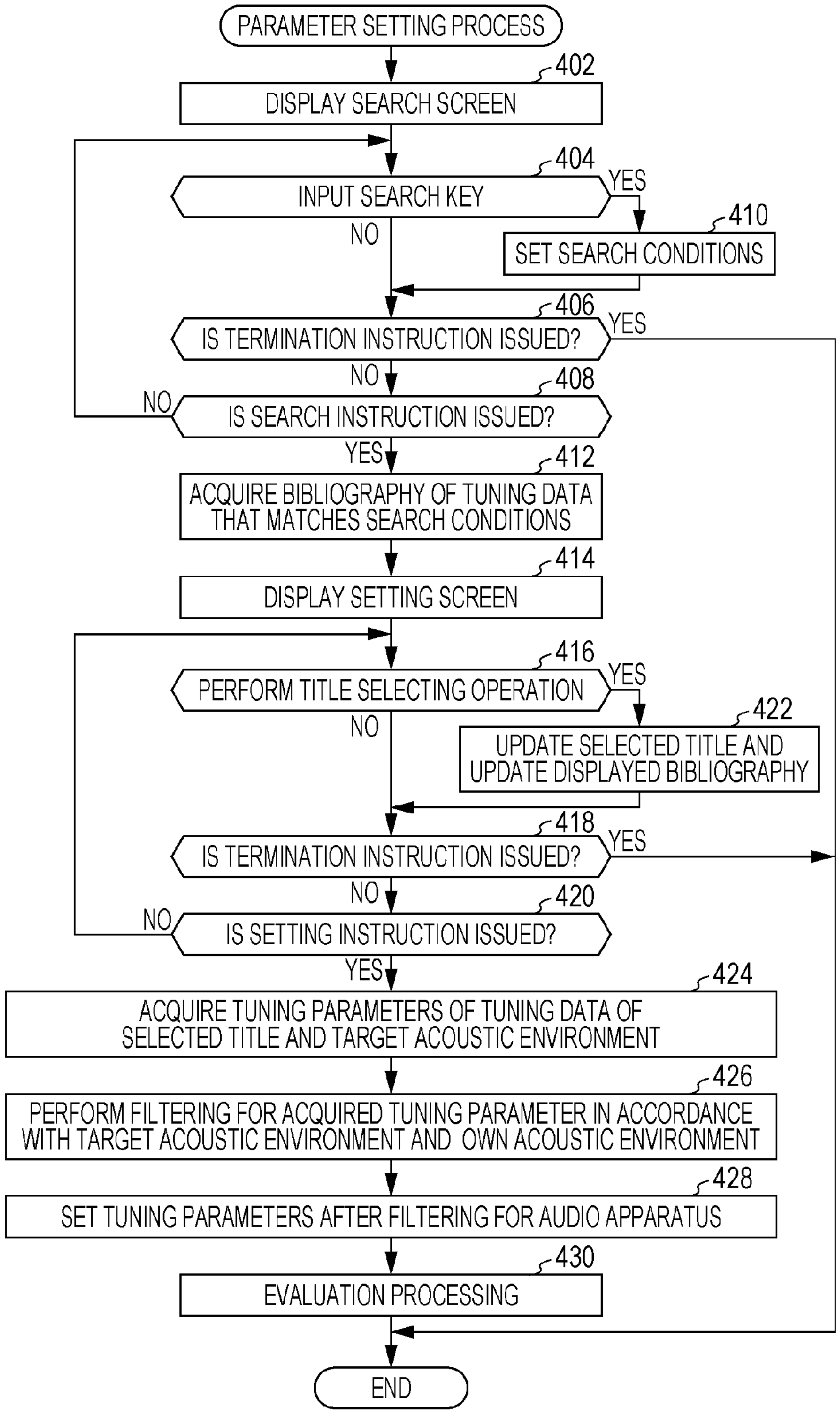
FIG. 4 is a flowchart illustrating a parameter setting process performed in an embodiment of the present invention.

FIG. 4 illustrates an example of the procedure of the parameter setting process. The parameter setting process is started using the audio setting application 209 when an instruction to start the parameter setting process is issued by a user.

Figure 5B:
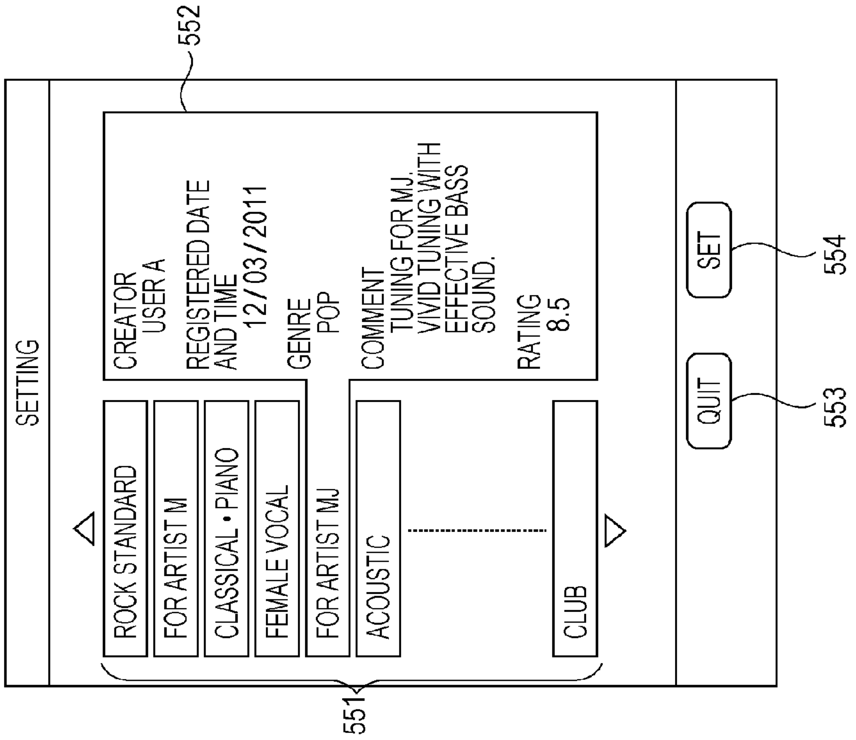
FIGS. 5A and 5B are diagrams illustrating a search screen and a setting screen used in an embodiment of the present invention.
Figure 5A:
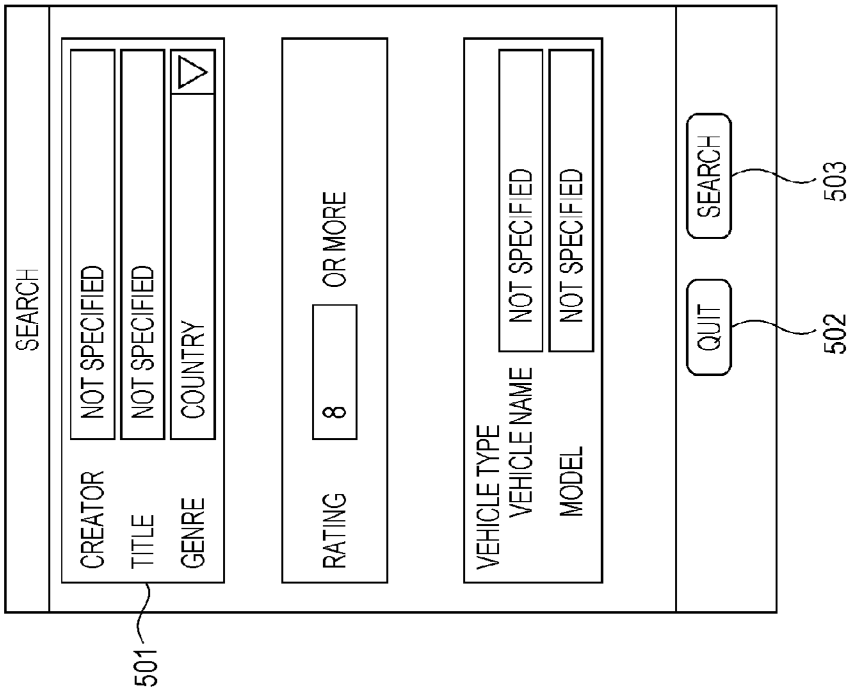

As illustrated in FIG. 4, in the parameter setting process, the audio setting application 209 of the smart phone 2 first displays a search screen illustrated in FIG. 5A on the display 203 (step 402), receives input of search keys for search items on the search screen (step 404), and sets search conditions including a set of search keys for each of the search items (step 410).

Here, as illustrated in FIG. 5A, the user is able to set search keys for search items by using input boxes for search items, such as the creator, the title, the genre, the rating, the vehicle name, and the automobile model, provided in search conditions input region 501 of the search screen. The user does not need to set search keys for all the search items. The user may set search keys for a desired number of items.

In the case where a termination instruction is issued in accordance with an operation on a quit button 502 provided on the search screen (step 406), the parameter setting process is terminated. In contrast, in the case where a search instruction is issued in accordance with an operation on a search button 503 provided on the search screen (step 408), by issuing to the tuning data providing server 31 a search request along with search conditions including a set of search keys for each of the search items received on the search screen, the bibliography of tuning data that matches the search conditions is acquired from the tuning support system (step 412).

Here, the tuning data providing server 31 receives the search request from the audio setting application 209, and searches the tuning data DB 32 for tuning data that matches the search conditions, that is, tuning data in which the contents that match (totally match or partially match) search keys, for all the search items of the search keys included in the search conditions, are registered as the contents of the search items of the search keys, and sends the bibliography of the found tuning data to the audio setting application 209.

As described above, the audio setting application 209 acquires the bibliography of the tuning data that matches the search conditions (step 412), and displays a setting screen illustrated in FIG. 5B on the display 203 (step 414).

As illustrated in FIG. 5B, on the setting screen, a title list 551 that is the list of titles included in the bibliography of the acquired tuning data and contents 552 of items of the bibliography of the tuning data whose title is selected on the title list 551 are displayed. At the time when the setting screen starts to be displayed, the first title in the title list 551 is automatically set as a selected title.

After the setting screen is displayed as described above (YES in step 414), execution of a title selecting operation by the user on the title list 551 is monitored (step 416). The issuance of a termination instruction by the user in accordance with an operation on a quit button 553 is monitored (step 418). The issuance of a setting instruction by the user in accordance with an operation on a set button 554 is monitored (step 420).

In the case where a title selecting operation is performed (YES in step 416), the selected title is updated to the title currently selected by the user, and the display of the contents 552 of the bibliography is updated to the contents of items of the bibliography corresponding to the title currently selected by the user (step 422). Then, the process returns to the monitoring processing in steps 416 to 420.

In the case where a termination instruction is issued (YES in step 418), the parameter setting process is terminated.

In the case where a setting instruction is issued (YES in step 420), by issuing to the tuning data providing server 31 a data transmission request including identification of tuning data of the title selected at the time of issuing the setting instruction, a target acoustic environment and tuning parameters of the tuning data corresponding to the selected title are acquired (step 424).

The tuning data providing server 31 receives a data transmission request from the audio setting application 209, acquires from the tuning data DB 32 the target acoustic environment and tuning parameters of the identified tuning data, and sends the acquired target acoustic environment and tuning parameters to the audio setting application 209. At this time, the number of times the identified tuning data has been downloaded is incremented by one.

After the target acoustic environment and the tuning parameters of the tuning data corresponding to the selected title are acquired as described above, filtering is performed for parameters included in the tuning parameters in accordance with the pattern of consistency or inconsistency of each acoustic environmental item between the acquired target acoustic environmental data and the own acoustic environmental data in the storage unit 201 (step 426).

Here, filtering is performed by excluding a parameter from tuning parameters in accordance with a specific correspondence between the pattern of inconsistency of each acoustic environmental item between target acoustic environmental data and own acoustic environmental data and a parameter to be excluded from tuning parameters.

The correspondence between the pattern of inconsistency and a parameter to be excluded from tuning parameters may be defined by associating a parameter to be excluded from tuning parameters with each pattern. However, the correspondence between the pattern of inconsistency and a parameter to be excluded from tuning parameters may be defined by associating an acoustic environmental item with a parameter to be excluded from tuning parameters in the case where information on the acoustic environmental item differs between target acoustic environmental data and own acoustic environmental data.

The correspondence between an acoustic environmental item and a parameter to be excluded from tuning parameters in the case where information on the acoustic environmental item differs between target acoustic environmental data and own acoustic environmental data will now be explained with reference to FIG. 6. Specifically, for example, in the case where the vehicle type (vehicle name and model) differs between target acoustic environmental data and own acoustic environmental data, a TCR parameter is excluded from tuning parameters. In the case where the size of a subwoofer differs between target acoustic environmental data and own acoustic environmental data, a crossover parameter is excluded from tuning parameters. In the case where the number of speakers differs between target acoustic environmental data and own acoustic environmental data, a TCR parameter and a crossover parameter are excluded from tuning parameters. In the case where the listening position differs between target acoustic environmental data and own acoustic environmental data, a TCR parameter is excluded from tuning parameters. As described above, in the case where information on each of acoustic environmental items differs between target acoustic environmental data and own acoustic environmental data, a parameter to be excluded from tuning parameters is defined. In the case where one of target acoustic environmental data and own acoustic environmental data represents that no subwoofer is provided and the other one of the target acoustic environmental data and the own acoustic environmental data represents that a subwoofer is provided, it is regarded that the size of a subwoofer differs between the target acoustic environmental data and the own acoustic environmental data.

For the use of the correspondence illustrated in FIG. 6, in the case where, for example, only the vehicle type differs between the acquired target acoustic environmental data and the own acoustic environmental data in the storage unit 201, filtering of tuning parameters is performed in such a manner that a TCR parameter is excluded from the tuning parameters and the other parameters remaining the tuning parameters. Furthermore, in the case where, for example, only the vehicle type and the subwoofer size differ between the acquired target acoustic environmental data and the own acoustic environmental data in the storage unit 201, filtering of tuning parameter is performed in such a manner that a TCR parameter and a crossover parameter are excluded from the tuning parameters and the other parameters remain in the tuning parameters.

The correspondence between an acoustic environmental item and a parameter to be excluded from tuning parameters in the case where information on the acoustic environmental item differs between target acoustic environmental data and own acoustic environmental data is set in such a manner that a parameter that does not contribute to the realization of the sound quality with the tuning parameters intended by a creator of the tuning parameters even if the parameter is used as a parameter for the acoustic environmental item of the audio apparatus 1 in the case where the acoustic environmental item differs between the acoustic environment represented by the target acoustic environmental data and the acoustic environment of the audio apparatus 1 is defined as a parameter to be excluded when information on the acoustic environmental item differs between the target acoustic environmental data and the own acoustic environmental data. That is, for example, in the case where the type of a vehicle or the number of speakers differs between target acoustic environmental data and own acoustic environmental data, the positional relationship of the speakers differs between two environments. Thus, even if the same parameter is used as a TCR parameter regarding audio image localization, the same audio image localization cannot be obtained. Therefore, in the case where the type of a vehicle or the number of speakers differs between target acoustic environmental data and own acoustic environmental data, the TCR parameter is set as a parameter to be excluded from tuning parameters. Furthermore, in the case where the configuration of a speaker system, such as the presence or absence of a subwoofer or the number of speakers, differs between target acoustic environmental data and own acoustic environmental data, since ranges desired to be covered by the individual speakers 102 differ between the two environments and the same sound quality cannot be expected even if the frequency bans of the sounds to be output to the speakers 102 are the same between the two environments, the crossover parameter is set as a parameter to be excluded from tuning parameters in the case where the size of a subwoofer or the number of speakers differs between the target acoustic environmental data and the own acoustic environmental data. Furthermore, in the case where, for example, the listening position differs between target acoustic environmental data and own acoustic environmental data, since audio images localized with the same relationship with respect to the listening position cannot be obtained even if the same parameter is used as a TCR parameter regarding audio image localization, the TCR parameter is set as a parameter to be excluded from tuning parameters in the case where the listening position differs between the target acoustic environmental data and the own acoustic environmental data. However, instead of the correspondence illustrated in FIG. 6, the correspondence defined in accordance with a policy to sound quality by a provider of the audio setting application 209 or the like may be used.

After filtering of the tuning parameters is performed as described above (step 426), the tuning parameters that have gone through filtering are set for the controller 106 of the audio apparatus 1 (step 428).

The controller 106 of the audio apparatus 1 receives the setting of the tuning parameters as described above, and changes set acoustic characteristic parameters in accordance with the tuning parameters as described above.

That is, for only an acoustic characteristic item of a parameter included in the set tuning parameters, a parameter included in the set acoustic characteristic parameters is changed into a parameter included in the set tuning parameters, and for an acoustic characteristic item of a parameter not included in the set tuning parameters, the current parameter for the acoustic characteristic item included in the set acoustic characteristic parameters is maintained.

The controller 106 of the audio apparatus 1 sets an equalizer parameter for a media player and sets a TCR parameter and a crossover parameter for each of the audio output devices 103 so that these parameters correspond to the changed set acoustic characteristic parameters.

As a result, for example, in the case where only an equalizer parameter is included in the tuning parameters, only the equalizer parameter included in the set acoustic characteristic parameters is changed so as to correspond to the equalizer parameter of the tuning parameters. Thus, only the equalizer characteristics (frequency characteristics of the gain) of the acoustic characteristics of the audio apparatus 1 are changed. Furthermore, for example, in the case where only an equalizer parameter and a TCR parameter are included in the tuning parameters, the equalizer parameter and the TCR parameter included in the set acoustic characteristic parameters are changed so as to correspond to the equalizer parameter and the TCR parameter included in the tuning parameters. Thus, only the equalizer characteristics and the TCR characteristics (delay between sounds output from the speakers 102) of the acoustic characteristics of the audio apparatus 1 are changed.

As a result, the acoustic characteristics of the audio apparatus 1 are changed in accordance with the tuning parameters downloaded from the tuning support system. Subsequently, in accordance with sound output from the audio apparatus 1, the user is able to evaluate the downloaded tuning parameters.

Then, the audio setting application 209 receives from the user the evaluation value for the tuning data of the selected title, and performs evaluation processing for transmitting to the tuning data providing server 31 an evaluation registration request including the evaluation value and identification of the tuning data corresponding to the selected title (step 430). Then, the audio setting application 209 terminates the audio setting process.

After receiving the evaluation registration request from the audio setting application 209, the tuning data providing server 31 updates the rating of the identified tuning data to (a×n+b)/(n+1), where "b" represents the received evaluation value, "a" represents the rating of the identified tuning data, and "n" represents the number of times of evaluation has been made, and increments the number of times evaluation of the identified tuning data has been made by one.

The parameter setting process performed using the audio setting application 209 of the smart phone 2 has been described above.

As described above, according to this embodiment, in accordance with the pattern of inconsistency between information on each acoustic environmental item represented by an acoustic environment included in tuning data and information on a corresponding acoustic environmental item under the acoustic environment of the audio apparatus 1, a parameter is selected from among parameters of a plurality of acoustic characteristic items represented by tuning parameters included in the tuning data, and only the selected parameter is set for the audio apparatus 1. Here, an acoustic characteristic item that is effective when a parameter of tuning parameters of tuning data is used under the acoustic environment of the audio apparatus 1 can be identified in accordance with the pattern of consistency or inconsistency between information on each acoustic environmental item represented by the acoustic environment included in the tuning data and information on a corresponding acoustic environmental item under the acoustic environment of the audio apparatus 1. Thus, according to this embodiment, only a parameter that is effective for the use under the acoustic environment of the audio apparatus 1 can be selected from among a plurality of parameters represented by tuning parameters included in tuning data stored in the tuning data DB 32, and the selected parameter can be set for the audio apparatus 1.

Consequently, according to an embodiment of the present invention, even tuning data including tuning parameters suitable for an acoustic environment that does not totally match the acoustic environment of the audio apparatus 1 can be used for the improvement of the sound quality of the audio apparatus 1 by only using some of parameters included in the tuning parameters. As a result, the availability of tuning data registered in a server can be improved.

In the embodiment described above, a user is able to search for tuning data, in accordance with search keys including a creator, a title, a genre, rating, a vehicle type, and an automobile model, on the search screen illustrated in FIG. 5A in the parameter setting process. However, searching for tuning data may be performed using search keys, such as other bibliographical items (for example, a comment), acoustic environmental items (for example, a listening position and a speaker system), and a registered date. Furthermore, searching for tuning data may be performed in accordance with a search key using a category to which the values of the bibliography and the acoustic environmental items belong. That is, for example, the type of an automobile, such as a sedan or a minivan, may be received as a search key on the search screen. In the tuning providing server, tuning data in which a vehicle name and model that belong to the type of an automobile set as a search key are registered may be searched for as tuning data that meets search conditions of the search key.

The embodiments described above may be similarly applicable to the case where, instead of the smart phone 2, a desired portable apparatus, such as a personal digital assistant (PDA) or a cellular phone, is connected to the on-vehicle apparatus and is used.

Furthermore, the audio setting application 209 and a mobile communication device of the smart phone 2 are provided in the embodiments described above. However, the audio setting application 209 of the smart phone 2 may be provided in the audio apparatus 1, so that the audio setting application 209 of the audio apparatus 1 performs the above-described processing using the mobile communication device of the smart phone 2. Alternatively, the audio setting application 209 and the mobile communication apparatus of the smart phone 2 may be provided in the audio apparatus 1, so that the audio apparatus 1 itself performs the processing described above.

Although preferred embodiments have been described in detail, the present invention is not limited to these specific embodiments. Rather, various modifications and changes can be made without departing from the scope of the present invention as described in the accompanying claims. Accordingly, all such modifications are intended to be included within the scope of this invention as defined in the following claims.

What is claimed is:

1. An acoustic characteristics setting support system for supporting setting of parameters defining acoustic characteristics of an audio apparatus, the system comprising:

a server in which a plurality of pieces of shared data are registered, each of the plurality of pieces of shared data including parameter data and acoustic environmental data;

wherein the parameter data is a set of parameters for a plurality of acoustic characteristic items;

wherein the acoustic environmental data represents an acoustic environment in a form of a set of values of a plurality of acoustic environmental items, availability of the set of parameters of the parameter data being checked for the acoustic environment; and an acoustic characteristics setting apparatus operatively coupled to the server, the acoustic characteristics setting apparatus further including:

a shared data acquiring unit configured to acquire the shared data from the server, a parameter-to-be-applied selecting unit configured to select a parameter for an acoustic characteristic item based on an acoustic environment consistency pattern, the pattern representing, for each acoustic environmental item, a degree of matching between the acoustic environmental data and a value of the acoustic environment from among parameters included in the parameter data included in the acquired shared data, and a parameter setting unit that sets the selected parameter for the audio apparatus, as a parameter for an acoustic characteristic item.

2. The acoustic characteristics setting support system according to claim 1, wherein the parameter-to-be-applied selecting unit acquires an acoustic characteristic item defined as an acoustic characteristic item to be applied in accordance with a specific correspondence between a pattern of consistency or inconsistency of a value of each acoustic environmental item and an acoustic characteristic item defined as an acoustic characteristic item to be applied, and selects, as the parameter to be applied, a parameter for an acoustic characteristic item obtained as the acoustic characteristic item to be applied from among the parameters included in the parameter data included in the acquired shared data.

3. The acoustic characteristics setting support system according to claim 1, wherein the parameter-to-be-applied selecting unit acquires an acoustic characteristic item defined as an acoustic characteristic item not to be applied in accordance with a specific correspondence between an acoustic environmental item having inconsistent values and an acoustic characteristic item defined as an acoustic characteristic item not to be applied, and selects, as the parameter to be applied, a parameter for an acoustic characteristic item not obtained as the acoustic characteristic item not to be applied from among the parameters included in the parameter data included in the acquired shared data.

4. The acoustic characteristics setting support system according to claim 1, wherein the parameter selected by the parameter-to-be-applied selecting unit is a parameter for an acoustic characteristic item that is estimated to have a similar effect on a sound quality achieved under the acoustic environment represented by the acoustic environmental data included in the acquired shared data is achieved on a sound quality of the audio apparatus under the acoustic environment of the audio apparatus.

5. The acoustic characteristics setting support system according to claim 1, wherein the acoustic environmental items include an item representing a configuration of a speaker system of the audio apparatus.

6. The acoustic characteristics setting support system according to claim 1, wherein the audio apparatus is mounted in an automobile, and wherein the acoustic environmental items include an item representing a vehicle type in which the audio apparatus is mounted.

7. The acoustic characteristics setting support system according to claim 1, wherein the audio apparatus is mounted in a vehicle, and wherein the acoustic environmental items include an item representing a listening position in the vehicle in which the audio apparatus is mounted.

8. The acoustic characteristics setting support system according to claim 1, wherein the acoustic characteristic items include any of an item representing frequency characteristics of a gain of the audio apparatus, an item representing delay characteristics between sounds output to speakers of the audio apparatus, and an item representing a frequency band of sounds output to the speakers of the audio apparatus.

9. The acoustic characteristics setting support system according to claim 1, wherein the server has a search function of searching for, in response to a search request, shared data that matches the specified search condition and providing the found shared data to the acoustic characteristics setting apparatus, and wherein the shared data acquiring unit acquires the shared data from the server by issuing the search request specifying the search condition to the server.

10. An acoustic characteristics setting apparatus for supporting setting of parameters defining acoustic characteristics of an audio apparatus, the device comprising:

a shared data acquiring unit that accesses a server in which a plurality of pieces of shared data are registered, each of the plurality of pieces of shared data including parameter data and acoustic environmental data wherein the parameter data corresponds to a set of parameters for a plurality of acoustic characteristic items;

wherein the acoustic environmental data represents an acoustic environment in a form of a set of values of a plurality of acoustic environmental items, availability of the set of parameters of the parameter data being checked for the acoustic environment, and acquires the shared data from the server;

a parameter-to-be-applied selecting unit configured to select a parameter for an acoustic characteristic item based on an acoustic environment consistency pattern, the pattern representing, for each acoustic environmental item, consistency or inconsistency between a value represented by the acoustic environmental data and a value under an acoustic environment from among parameters included in the parameter data included in the acquired shared data; and a parameter setting unit configured to set the selected parameter for the audio apparatus, as a parameter for an acoustic characteristic item.

11. The acoustic characteristics setting apparatus according to claim 10, wherein the parameter-to-be-applied selecting unit acquires an acoustic characteristic item defined as an acoustic characteristic item to be applied on the basis of the acoustic environment consistency pattern in accordance with a specific correspondence between a pattern of consistency or inconsistency of a value of each acoustic environmental item and an acoustic characteristic item defined as an acoustic characteristic item to be applied, and selects, as the parameter to be applied, a parameter for an acoustic characteristic item obtained as the acoustic characteristic item to be applied from among the parameters included in the parameter data included in the acquired shared data.

12. The acoustic characteristics setting apparatus according to claim 10, wherein the parameter-to-be-applied selecting unit acquires an acoustic characteristic item defined as an acoustic characteristic item not to be applied on the basis of the acoustic environment consistency pattern in accordance with a specific correspondence between an acoustic environmental item having inconsistent values and an acoustic characteristic item defined as an acoustic characteristic item not to be applied, and selects, as the parameter to be applied, a parameter for an acoustic characteristic item not obtained as the acoustic characteristic item not to be applied from among the parameters included in the parameter data included in the acquired shared data.

13. The acoustic characteristics setting apparatus according to claim 10, wherein the parameter selected by the parameter-to-be-applied selecting unit as the parameter to be applied is a parameter for an acoustic characteristic item that is estimated that an effect that is similar to an effect on a sound quality achieved under the acoustic environment represented by the acoustic environmental data included in the acquired shared data is achieved on a sound quality of the audio apparatus under the acoustic environment of the audio apparatus.

* * * * *